United States Patent
Jensen et al.

(10) Patent No.: US 8,515,858 B2
(45) Date of Patent: Aug. 20, 2013

(54) METHOD AND ARRANGEMENT FOR PRE-MATCH RISK VALIDATION OF ORDERS IN AN AUTOMATED EXCHANGE

(75) Inventors: Daniel Jensen, Saltsjö-Bo (SE); Tobias Hallor, Saltsjö-Bo (SE)

(73) Assignee: OMX Technology AB, Stockholm (SE)

( * ) Notice: Subject to any disclaimer, the term of this patent is extended or adjusted under 35 U.S.C. 154(b) by 0 days.

(21) Appl. No.: 13/471,526

(22) Filed: May 15, 2012

(65) Prior Publication Data

US 2012/0296797 A1    Nov. 22, 2012

Related U.S. Application Data

(60) Provisional application No. 61/487,766, filed on May 19, 2011.

(51) Int. Cl.
*G06Q 40/00*    (2006.01)

(52) U.S. Cl.
USPC .............................. 705/37; 705/38

(58) Field of Classification Search
USPC ....................................... 705/35–40
See application file for complete search history.

(56) References Cited

U.S. PATENT DOCUMENTS

2011/0264577 A1*    10/2011    Winbom et al. ................. 705/37

* cited by examiner

*Primary Examiner* — Thu Thao Havan
(74) *Attorney, Agent, or Firm* — Nixon & Vanderhye P.C.

(57) ABSTRACT

In an automated exchange, comprising a matching module, a received order is validated for risk purposes before a match process begins. Hereby it is made possible to reduce the total financial exposure by a customer to the automated exchange.

16 Claims, 3 Drawing Sheets

METHOD AND ARRANGEMENT FOR PRE-MATCH RISK VALIDATION OF ORDERS IN AN AUTOMATED EXCHANGE

This application claims the benefit of 61/487,766, filed May 19, 2011, the entire contents of which are hereby incorporated by reference.

TECHNICAL FIELD

The invention relates to a method and an arrangement for validating received orders in a matching module of an automated exchange and in particular the invention relates to a method and an arrangement to risk validate an order before it is accepted for matching.

BACKGROUND

When a seller and a buyer, i.e. order or quote owners, agree to a particular price for a financial instrument they complete a trade. I.e. they complete a verbal, or electronic, transaction involving one party buying a financial instrument from another party. The trades are typically initiated and completed by trading participants; such as individuals, firms, dealers (who may be either individuals or firms), traders and brokers or sometimes by the order owners themselves. Trading of financial instruments is generally performed on an exchange, i.e. a trading venue and the trading is typically done through brokers, or traders, who buy or sell the financial instruments on behalf of the order owners. Thus, there are a variety of exchange participants which are coupled to an automated exchange through the members of the exchange. The term "financial instruments" is used herein in a broad sense and encompasses any tradable item i.e. securities, derivative or commodity, such as stocks, bonds, cash, swaps, futures, foreign exchange, options, gas electricity and so forth, or group of items that is traded through matching of counterparty orders (bid, offer).

A conventional automated exchange typically receives order input data, in the form of data messages, from external devices used by traders, or brokers. The traders, or brokers, submit orders and/or quotes (or alterations/cancellations thereof) to the automated exchange for purposes of trading. In this context, an order is a request to sell or buy a financial instrument from any trading participant of the automated exchange and a "quote" may be an "offer" price, a "bid" price, or a combination of both an "offer" and "bid" price of a financial instrument, and is determined from quotations made by market makers (or dealers).

The orders/quotes may relate to buying and/or selling of any type of financial instrument. In particular, the input data to the automated exchange can be an order data message that represents the placing of a new bid or sell order, or a new quote. The order data message can also represent the change of an existing bid or sell order, or a quote. In addition, the order data message can represent a cancellation/change of an existing bid or sell order, or a quote.

FIG. 1 illustrates a conventional automated exchange system 100 comprising trader terminals 110 that are used for issuing order data messages, i.e. input data received by the automated exchange 140. The trader terminals 110 are connectable, for example over the internet 120, or over some other connection means like a dedicated fiber 120B, to an electronic marketplace, i.e. an automated exchange 140. The automated exchange 140 can be hosted on a computer server or a cluster of computer servers. Sometimes the trader terminals 110 are connected to the automated exchange 140 through an entry gateway 130. The entry gateway 130 is connected to, or being a part of, the automated exchange 140 and is configured to receive market actions, i.e. orders and/or quotes from the trader terminals 110. An entry gateway 130 is usually in connection with the automated exchange 104 on a dedicated network and forwards the market actions to the automated exchange 140 and further usually broadcast updates back to the trader terminals 110. It should however be understood that information being communicated to and from the automated exchange 140 and the trader terminals 101 could be communicated via a single communication path.

While the trading terminals 110 in FIG. 1 are illustrated as trading terminals that traditionally are associated with manual input of market actions, the trading terminals 110 can also be implemented as algorithmic trading units, sometimes termed automatic order generators, having manual input means for control of the algorithmic trading unit. The algorithmic trading unit is pre-programmed with instructions to automatically generate sell and buy orders and quotes (or changes/cancellations thereof) in response to input data received from the automated exchange 140. The trading terminals 110 also represent market makers inputting quotes to the automated exchange 140.

There is a constant need and desire to improve upon existing automated exchange systems and to provide solutions that operate with fewer drawbacks than pre-existing automated exchange systems. Also, due to today's frenetic markets and recent events in the financial industry; i.e. such as the flash crash of May 2010, market regulators require stricter control of financial exposure of participants and members of an exchange.

The financial exposure can be seen as the aggregated sum of all quotes and orders submitted intraday to an exchange, from a specific customer or participant of said exchange. For example, the financial exposure could be modeled as a maximum risk limit, which could be defined as: e.g. all users from Goldman Sachs could be allowed to have a total pending, intraday, volume of $1000 Million on the NASDAQ OMX Stock Exchange. This would in the above example constitute the intra-day maximum risk exposure which is allowed for Goldman Sachs.

Currently, many securities firms manage their risk and their clients' risk on an end-of-day basis. I.e. the total financial exposure is measured in regards of trades made until the end of each day. Other securities firms measure the total financial exposure based on order book content. I.e., the total financial exposure is measured 'post-order'. That is, after the incoming order is received and processed by a matching engine and thereafter being placed in an order book. A disadvantage with present solutions is the possibility that the aggregated sum of all pending orders in an order book, from the specific customer, will exceed a total risk limit for that specific customer. In practice, this results in new orders being accepted and inserted into the order book, even though the total financial exposure limit of said specific customer is surpassed. This approach means that for these firms their intraday exposure to trades could exceed risk profiles established by contractual, statutory and/or regulatory guidelines. These risks could result in (i) the inability of the firms to meet capital adequacy requirements, (ii) the firms having to take contractual actions to protect themselves that could be detrimental to their clients or (iii) the firms having to take client exposures onto their own books to address the risk.

SUMMARY

It is an object of embodiments of the invention to provide an improved automated exchange and a method of operating the same. This object is addressed by the present invention as set out in the appended independent claims. Advantageous embodiments are recited in the appended dependent claims.

Thus, an automated exchange in accordance with embodiments of the invention is configured to receive a message comprising an order to buy or sell a financial instrument. The received message further comprises an order specific parameter for the financial instrument and information of a risk entity linked to the received order. The automated exchange comprises a memory which is configured to store maximum risk exposure parameters for each risk entity that is associated to the exchange. The memory is further configured to store risk validated, but unmatched, orders in an order book. The memory is operatively coupled to a processing logic which comprises a data retrieval module that is configured to retrieve a maximum risk exposure parameter for the risk entity linked to the received order, from the memory. The processing logic further includes a comparator module that is configured to compare the retrieved maximum risk exposure parameter with an aggregated risk value. The aggregated risk value comprises a sum of previously, in the order book, stored order specific parameters for the risk entity linked to the order and the received order specific parameter. Finally, the processing logic comprises a control module which is configured to acknowledge, before matching the received order with orders previously stored in the order book, that the order is risk validated to make sure that the aggregated risk value does not exceed the retrieved maximum risk exposure parameter. Hereby, risk exposure validation can be performed before an order is accepted for matching and submitted to an order book.

In accordance with one example embodiment the automated exchange further includes a matching module which is configured to perform a matching process. The matching process attempts to match risk validated orders with previously risk validated and stored orders. Furthermore, the control module is configured to send the acknowledged and risk validated order to a matching process of the matching module, attempting to match said risk validated order, with orders previously risk validated and stored in the order book.

Also disclosed, is a method for risk exposure validation of orders in an automated exchange. In accordance with embodiments of the invention, the method comprises receiving by the automated exchange, an order message to buy or sell a financial instrument. The received order message comprising data related to a risk entity linked to the received order and an order specific parameter for the financial instrument to be traded. The method further comprises retrieving, from a non-volatile storage, a maximum risk exposure parameter for the risk entity that is linked to the order. This is followed by comparing the fetched maximum risk exposure parameter to an aggregated risk value. The aggregated risk value comprises the sum of previously stored order specific parameters and the received order specific parameter. The method further comprises validating, before attempting to match the received order with orders previously stored in an order book, that the order is accepted for risk purposes if the aggregated risk value does not exceed the maximum risk exposure parameter.

In accordance with one embodiment the invention, the method further comprising sending the received and risk validated order to a matching process of a matching module, there attempting to match the received and validated order with orders previously stored in the order book.

BRIEF DESCRIPTION OF THE DRAWINGS

The invention will now be described in more detail, by non-limiting examples and with reference to the accompanying drawings, in which.

DETAILED DESCRIPTION

In the following description, for purposes of explanation and not limitation, specific details are set forth such as particular architectures, interfaces, techniques, etc. in order to provide a thorough understanding of the present invention.

In short, the aim with present invention is to provide a risk management solution to manage total financial exposure for an individual participant and financial instrument type. This solution will enable validation of all orders before they are accepted by a matching engine and matched against other orders or inserted to the order book. Orders will be rejected if the total financial exposure is above the specific configuration for that specific participant.

Figure 1:
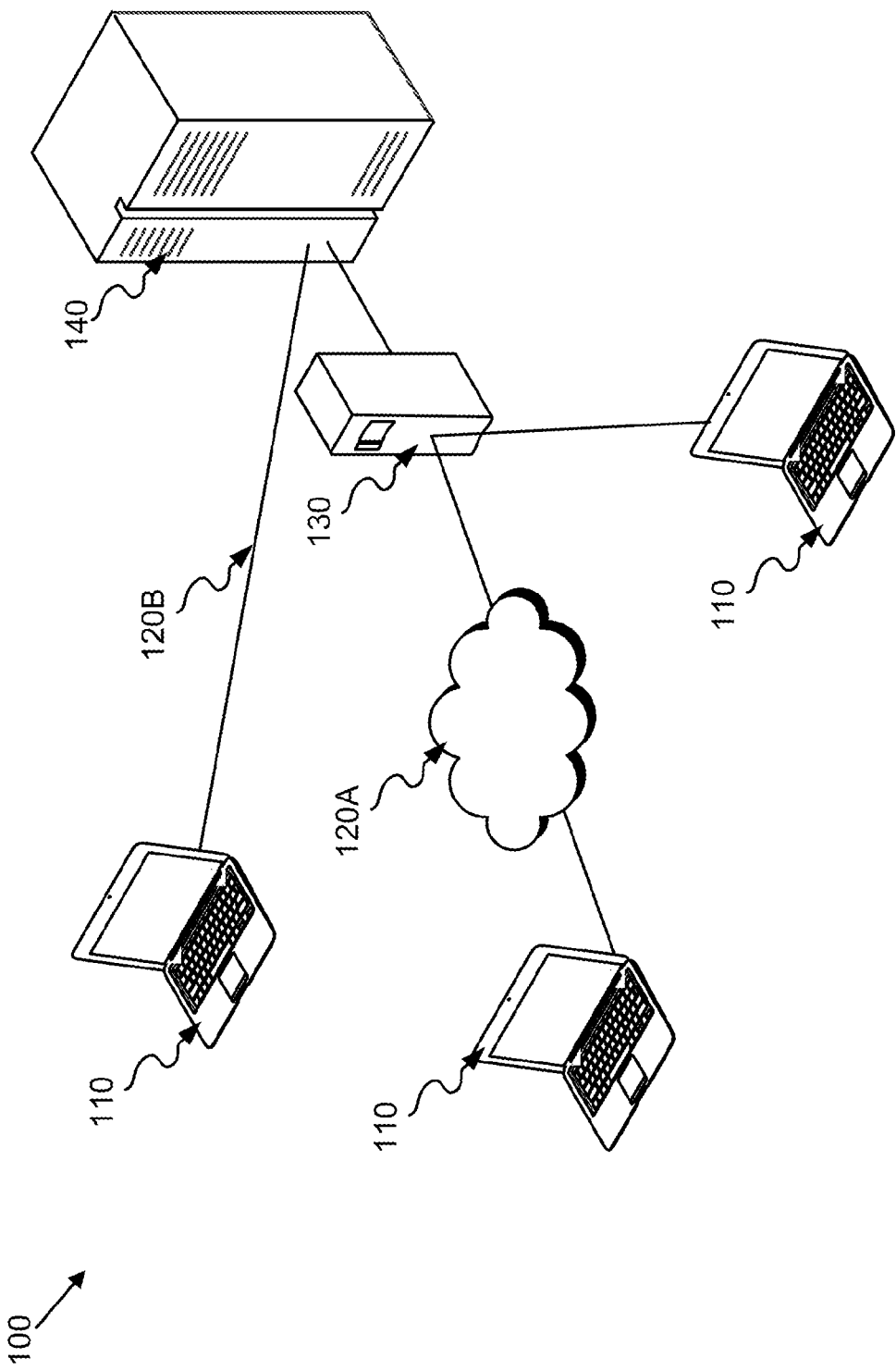
FIG. 1 illustrates an automated exchange for automated electronic trading of financial instruments.
Figure 2:
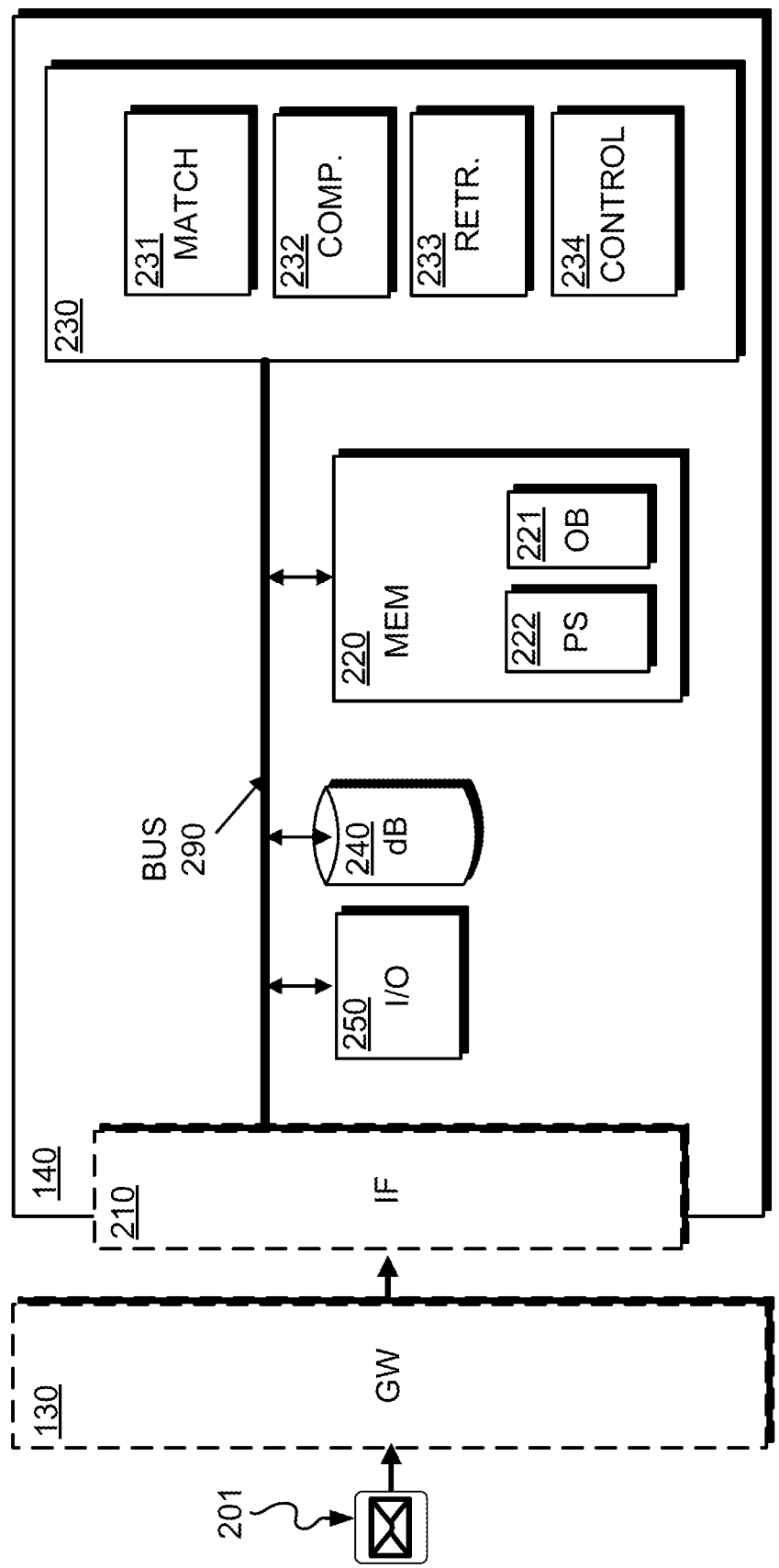
FIG. 2 illustrates a block diagram of an embodiment for an automated exchange.

FIG. 2 illustrates an example embodiment of the automated exchange 140, implemented on a computer and comprising a memory 220 (typically a random access memory, RAM, or another non-volatile storage means), a processing logic 230, a storage memory 240 (e.g. a hard drive) and an input/output (I/O) controller 250, all coupled by a bus 290. The processing logic 230 may include a processor, microprocessor, an ASIC, FPGA, or the like. The processing logic 230 comprises further a matching module 231, a comparator module 232 and a data retrieval module 233.

The automated exchange 140 is configured to receive a message 201, typically via a gateway 130. The received message 201 which includes an order to buy or sell a financial instrument, further includes at least one order specific parameter for the financial instrument to be traded. The order specific parameter for the financial instrument to be traded is typically order size and/or order value prize. However, in some embodiments of the invention there can also be other order characteristics, such as order type that are order specific parameters for the financial instrument. The received message 201 also includes information of a risk entity, which is linked to the received order. The risk entity is typically a member of the exchange 140 or it may, in some embodiments, be other exchange participants such as traders, brokers or others. The message 201 is then routed, typically via an interface module 210 of the automated exchange 140, to the processing logic circuitry 230. When the processing logic 230 receives an order, a check will be performed to investigate whether or not the incoming order should be accepted or not, based on the current total financial exposure for that risk entity. Typically, risk validation will only be performed when new orders are received by the processing logic 230 of the automated exchange 140.

In some embodiments a new Bid order is accepted if the incoming bid order total size+sum of the trading entity's long trades−sum of the trading entity's short trades+sum of existing active bid orders total size from the trading entity<=maximum risk exposure parameter and a new offer order is accepted if incoming offer order total size+sum of the trading entity's short trades−sum of the trading entity's long trades+sum of existing active offer orders total size from the trading entity<=maximum risk exposure parameter.

Further, in some embodiments of the invention a new bid order is accepted if the normalized value for an incoming bid order total size+the normalized sum of the trading entity's long trades−sum of the trading entity's short trades+the normalized sum of existing active bid orders total size from the same trading entity<=maximum risk exposure parameter. A new offer order is accepted if the normalized value of incoming offer order total size+normalized value of sum of the trading entity's short trades−sum of the trading entity's long trades+normalized value of sum of existing active offer orders total size from the same trading entity<=maximum risk exposure parameter.

The quantity of an order/trade is considered a positive number in the statement above regardless of order book side. Also, trades will net the total risk exposure. I.e. the sum of the trading entity's long trades−sum of the trading entity's short trades can be netted for each financial instrument. That is, when calculating an aggregated risk sum of the trading entity's long trades−sum of the trading entity's short trades is sometimes represented by a net sum of intraday trades.

The automated exchange 140 in an exemplary embodiment comprises a memory 220 that is configured to store risk validated, but unmatched, orders in an order book 221. The memory 220 is furthermore configured to store maximum risk exposure parameters 222 for each and all risk entities that are associated to the exchange 140. These parameters, or rules, together with external interface or analysis systems are managed, via a hierarchy, to set overall criteria for either a group of risk entities; i.e. participants, specialized criteria for individual risk entities at any level within a defined hierarchy, or other suitable criteria. These parameters, or rules, together with the external interface or analysis systems can be used to adjust one or more financial exposure ratings that will be used. Typically updates of the maximum risk parameters are performed on a provided interface to the automated exchange 140 by way of a dedicated computer terminals, password protected Web site, voice-prompted telephone interface, computer interface or other known methods of interaction between systems. As should be noted, intraday updates of maximum risk exposure parameters are possible and may occur. Thus, as soon as a new order is being entered into the market (i.e. the automated exchange 140) by a risk entity, the order will be validated against the new maximum risk exposure parameter, based on the accumulated orders and net trades of this specific risk entity. Typically, orders resting in the order book 231 will remain in the market. However, in some embodiments of the invention, the orders resting the order book 231 will be re-validated for risk purposes and, based on time stamps, the orders violating the newly set maximum risk exposure criteria will be rejected.

The memory 220 is operatively coupled, typically by a bus, to the processing logic 230 which processing logic 230 comprises the data retrieval module 233. The data retrieval module 233 is configured to retrieve a, previously set and stored, maximum risk exposure parameter, for the risk entity that is linked to the received order, from the memory 220.

The processing logic 230 further includes the comparator module 232 which is configured to compare the retrieved maximum risk exposure parameter with an aggregated risk value. The aggregated risk value comprises a sum of previously, in the order book 221, stored order specific parameters for the risk entity linked to the order and the received order specific parameter. In some embodiments, the aggregated risk value comprises a sum of normalized risk values associated with previously, in the order book 221, stored order specific parameters for the risk entity linked to the order and a normalized risk value associated with the received order specific parameter. In some embodiments the aggregated risk value additionally comprises a normalized value of a net sum of intraday trades, in order to account for the added financial exposure of already executed trades. Typically, the aggregated risk value is calculated by the comparator module as part of the comparison.

Various aggregation tools can be used to interact with different technologies and topologies, to aggregate the desired information with the aid of the comparator module 232. When relevant information, related to a given transaction, is found an aggregation component of the comparator module 232 extracts and collects the relevant information and, if necessary, packages, or translates it into an appropriate normalized format and submits it to an analysis component of the comparator module 232.

The processing logic 230 further includes the control module 234 which is configured to acknowledge, before matching the received order with orders previously stored in the order book 221, that the order is risk validated if the aggregated risk value does not exceed the retrieved maximum risk exposure parameter. In some embodiments of the invention the control module 234 performs the extraction, collection, translation and analysis of the relevant information as described above.

In some embodiments a normalization of the financial risk exposure is required as some of the instrument types being traded present different risk sensitivity. The different risk sensitivity is sometimes configured as a risk factor for each financial instrument. For some financial instruments the aggregated risk value thus depends on the normalization of the risk elements summing to the financial risk exposure. Typically, each risk element associated with a financial instrument is translated into a normalized risk value by applying the risk factor associated with the financial instrument to the risk element. For example, a received order for a financial instrument can be translated into a normalized risk value by multiplying the risk factor associated with the financial instrument and the order specific parameter associated with the received order. The normalized risk value associated with a specific order is sometimes referred to as an order specific risk value.

To exemplify, on reception of an order for an options instrument a normalized risk value associated with the received order, i.e. an order specific risk value, can be determined by multiplying the risk factor associated with the options instrument and an order specific parameter associated with the received order.

In some embodiments of the invention the acknowledgement of a risk validated order is executed by the control module 234 setting a bit, or a flag, in relation to the order. This indicates that the order has been risk validated and is ok for further processing; i.e. matching. In some embodiments of the invention, the control module 234 is further configured to delete the received message if the aggregated risk value exceeds the retrieved maximum risk exposure parameter. In accordance with the various embodiments of the invention, the modules described in the processing logic above can be integrated into a single processing unit or implemented by several processor units/cores and comprise software or hardware, either separately or in combination.

Should however the result of the comparison be negative, i.e. the aggregated risk value exceeds the retrieved maximum risk exposure parameter, the order will be rejected. When an order is being rejected a directed message will be transmitted to the affected risk entity. The purpose of this is to informing the affected risk entity that the maximum risk exposure limit has been breached or is about to be breached. Hence, the message activation is configurable and a message will be sent when the risk exposure moves from a value below of equal to a predefined threshold, to above that predefined threshold. The broadcast will typically include following information;

instrument type, side (bid/ask), user and customer; i.e. risk entity. That is, for whom the order was received. The broadcast may additionally also include breach type (Warning=x % breach or Rejected=100% breach), order price and order total volume. As should be noted, in some embodiments of the invention "on-behalf of" orders will also be affected by pre-order risk validation. In short, the processing logic will look for the actual owner of the order when verifying the risk values, i.e. the actual submitter of the order may not be verified. For example, a user within Goldman Sachs transmits an order on behalf of a trader in JP Morgan. Then the risk will be verified against JP Morgan's total maximum financial exposure. In some embodiments of the invention, an 'on-behalf of' order is risk validated in regards to both the actual owner of the order and the actual submitter of the order. That is, the order is acknowledged as valid only if neither the aggregated risk value associated with the order owner exceed the maximum risk exposure parameter associated with the order owner nor the aggregated risk value associated with the order submitter exceed the maximum risk exposure parameter associated with the order submitter.

In accordance with various embodiments described herein, the matching module 231 is configured as depicted in FIG. 2. The matching module 231 is adapted to perform matching of quotes and orders received as order messages 201 to the exchange 140 via the network interface 210. In addition to receiving orders and quotes via the network interface 210 the processing logic 230 is adapted to decode the received order message 201 which, as previously mentioned, comprises data related to a risk entity linked to the received order, i.e. an owner of the order, an exchange participant or an exchange member. The received order message 201 further comprises other order specific parameters for the financial instrument. These order specific parameters are typically, but not limited to, order size and order prize. After decoding the received order messages 201, the data retrieval module 233 of the processing logic 230 is configured to retrieve S410 a maximum risk exposure parameter for the risk entity linked to the received order, from a set of maximum risk exposure parameters 222 of the memory 220.

The maximum risk exposure parameter is configurable and set up per financial instrument type and for each risk entity; i.e. typically an order owner. In some embodiments of the invention the maximum risk exposure parameter is expressed in Millions; e.g. the value 1 represents 1 Million (of selected currency). The maximum risk exposure parameter refers to the total financial exposure of a specific risk entity, which in some embodiments are subject of intra-day changes. For instance, if a risk entity; i.e. typically member of the exchange 140, suddenly finds himself in financial or legal difficulties, the maximum risk exposure parameter is lowered in order to reduce the total financial risk linked to this specific risk entity. Furthermore, in some embodiments of the invention, it is possible to disable the pre-match risk validation intraday by removing the maximum risk exposure parameter of a specific owner/customer. In some embodiments of the invention, it is possible to toggle the pre-match risk validation between an enabled and a disabled mode intraday by setting or removing the maximum risk exposure parameter of a specific owner/customer for a particular instrument.

In some embodiments, the memory 220 is further being arranged to store various data for the automated exchange 140. In particular, the memory 220 is configured to store an order book 221 comprising matchable sell/buy orders and quotes. The matchable sell/buy orders and quotes stored in the order book 221 are those that not previously are matched by the matching module 231 and are sell/buy orders of a type that permits storing. The memory 220 is further configured to store maximum risk exposure parameters in a maximum risk exposure parameter memory set 222. In some embodiments, the memory is further configured to store a set of risk factors, each risk factor being related to the risk sensitivity of a financial instrument.

While, in FIG. 2, only one processor unit 230 and one memory unit 220 are explicitly illustrated, it should be understood that the automated exchange 140 in some embodiments is configured with several processors 230 and or memories 220 interconnected according to normal practices in the field of computer science, but for sake of clarity only one of each is explicitly shown. The storage memory 240 is arranged to store executable computer programs and various database information.

In some embodiments, the automated exchange 140 is implemented on a server type computer and further comprises a network interface 210. In yet some embodiments the automated exchange 140 is included in a cluster of such server type computers. In yet some embodiments the automated exchange 140 is implemented on a server system including one or more processors that are configured to work as central automated exchange 140 for matching of financial instruments.

The automated exchange 140 is, through the network interface 210, connectable to an external network, not illustrated in FIG. 2. The network interface 210 is a module or a device capable of sending/receiving data traffic i.e. a type of transceiver module or transceiver circuit. The network interface 210 being capable of transmission and reception of various data formats, typically the received or transmitted data is channeled via a so called FIX protocol or the so called OMNet protocol (or ITCH or OUCH protocols). However, as should be appreciated, embodiments of the invention are not limited to these protocols. The network (not illustrated) comprises conventional network means, as well as front end applications. Examples of such front end applications are trading systems (not illustrated) and trading terminals 110 that are used by participants of the automated exchange 140 for submitting market actions (i.e. input data messages 201 comprising new, altered or cancelled orders and or quotes) to the automated exchange 140.

In some embodiments, the modules and interfaces described above comprise hardware components or a combination of hardware and software components. Further, in some embodiments the matching module 231 comprises a computer program, or part of a computer program stored at a memory allocation 220, 240 and a processor logic 230 that is configured to access the computer program, such that the processing logic 230 performs the methods according to the embodiments described herein. Yet, in some embodiments the processing logic 230 is of a standard type single or dual core processor and in some embodiments the processor is of a multi-core processor type.

Figure 3:
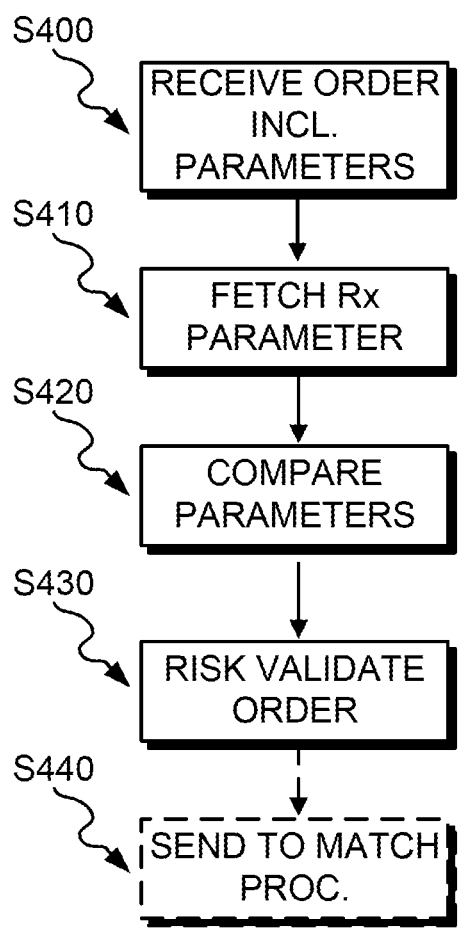
FIG. 3 illustrates a flow diagram depicting some procedural steps performed in an automated exchange

FIG. 3 is a flowchart illustrating some procedural steps performed in an example embodiment of the invention. The method illustrating risk validation of a received order before sending it to a matching process. The method comprises receiving a message, which message includes an order to buy or sell a financial instrument. The message also further includes information of a risk entity linked to the received order and an order specific parameter for the financial instrument to be traded. The order specific parameter typically includes size and value of the order. The method further comprises retrieving a maximum risk exposure parameter, for the risk entity which is linked to the order, from a memory. Then the method includes comparing the retrieved maximum risk exposure parameter with an aggregated risk value. The aggregated risk value comprises the sum of previously stored order specific parameters for the risk entity linked to the order and the received order specific parameter. This is followed by validating, before attempting to match the received order with previously stored orders, that the order is risk validated if the aggregated risk value does not exceed the retrieved maximum risk exposure parameter.

In some embodiments, the method further comprising sending the received and risk validated order to a matching process of a matching module, attempting to match the received and validated order with orders previously stored in the order book.

In some embodiments, the aggregated risk value comprises a sum of normalized risk values associated with previously, in the order book, stored order specific parameters for the risk entity linked to the order and a normalized risk value associated with the received order specific parameter. In some embodiments the aggregated risk value additionally comprises a normalized value of a net sum of intraday trades, in order to account for the added financial exposure of already executed trades.

In some embodiments, the method further comprising calculating the aggregated risk value as a sum of order specific risk values associated with previously, in the order book, stored orders for the risk entity linked to the received order, an order specific risk value associated with the received order and the net sum of intraday trades of said risk entity. Typically, the order specific risk values are calculated based on a risk factor associated with the financial instrument being specified in the received order and the order specific parameter associated with each order.

This ability to risk validate incoming orders before entering the matching process provides numerous advantages, compared to pre-existing automated exchanges. Using the methods and arrangements as described herein it will be possible to pre-match validating of received orders, in real-time, before these are accepted by the matching engine for further processing. This, in turn, will improve the efficiency within the automated exchange system in that the total latency can be significantly reduced. Furthermore, it will enable a more precise upholding of established risk profiles.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An automated exchange configured to receive a message comprising an order to buy or sell a financial instrument, the message further comprising an order-specific parameter for the financial instrument and information about a risk entity linked to the received order, the automated exchange comprising:
a memory configured to store maximum risk exposure parameters for each risk entity which is associated with the automated exchange, the memory further being configured to store risk validated, but unmatched, orders in an order book; the memory being operatively coupled to;
a processing logic comprising:
a data retrieval module configured to retrieve a maximum risk exposure parameter, for the risk entity linked to the received order, from the memory;
a comparator module configured to compare the retrieved maximum risk exposure parameter with an aggregated risk value comprising a sum of previously, in the order book, stored order-specific parameters for the risk entity linked to the received order, the received order-specific parameter, and a net sum of intraday trades of said risk entity; and
a control module configured to acknowledge, before matching the received order with orders previously stored in the order book, that the order is risk validated if the aggregated risk value does not exceed the retrieved maximum risk exposure parameter.

2. The automated exchange according to claim 1, wherein the processing logic further comprises:
a matching module configured to match risk validated orders with previously risk validated and stored orders; and wherein
the control module further being configured to send the risk validated order to a matching process of the matching module, attempting to match the risk validated order with orders previously risk validated and stored in the order book.

3. The automated exchange according to claim 1, wherein the processing logic further is configured to enabling or disabling the pre-match risk validation intraday, for a specific risk entity, by setting or removing the maximum risk exposure parameter of said specific risk entity.

4. The automated exchange according to claim 1, wherein the control module further is configured to delete the received message if the aggregated risk value exceeds the retrieved maximum risk exposure parameter.

5. The automated exchange according to claim 1, wherein the automated exchange further is configured to transmit a response message to the entity linked to the received message if the aggregated risk value exceeds the retrieved maximum risk exposure parameter.

6. The automated exchange according to claim 5, wherein the response message is transmitted to the entity linked to the received order by way of a broadcast.

7. The automated exchange according to claim 1, wherein the aggregated risk value comprises a sum of order-specific risk values associated with previously, in the order book, stored orders for the risk entity linked to the received order, an order-specific risk value associated with the received order and a net sum of intraday trades of said risk entity.

8. The automated exchange according to claim 7, wherein the order-specific risk values are calculated based on a risk factor associated with the financial instrument being specified in the received order and the order-specific parameter associated with each order.

9. A method in a processing logic of an automated exchange, the method comprising:
receiving by the processing logic, a message comprising an order to buy or sell a financial instrument, the message further including an order-specific parameter for the financial instrument and information about a risk entity linked to the received order;
retrieving, by the processing logic, a maximum risk exposure parameter of the risk entity linked to the order, from a memory;
comparing, by the processing logic, the retrieved maximum risk exposure parameter with an aggregated risk value comprising a sum of previously stored order-specific parameters for the risk entity linked to the received order, the received order-specific parameter and a net sum of intraday trades of said risk entity; and validating, before attempting to match the received order with previously stored orders, that the order is risk validated if the aggregated risk value does not exceed the retrieved maximum risk exposure parameter.

10. The method according to claim 9, further comprising:

sending the received and risk validated order to a matching process of a matching module, attempting to match the received and validated order with orders previously risk validated and stored in the order book.

11. The method according to claim 9, further comprising:

setting or removing the maximum risk exposure parameter of a specific risk entity.

12. The method according to claim 9, further comprising:

deleting the received message if the aggregated risk value exceeds the retrieved maximum risk exposure parameter.

13. The method according to claim 9, further comprising:

transmitting a response message to the entity linked to the received message if the aggregated risk value exceeds the retrieved maximum risk exposure parameter.

14. The method according to claim 13, wherein the response message is transmitted to the entity linked to the received order by way of a broadcast.

15. The method according to claim 7, further comprising:

calculating the aggregated risk value as a sum of order-specific risk values associated with previously, in the order book, stored orders for the risk entity linked to the received order, an order-specific risk value associated with the received order and a net sum of intraday trades of said risk entity.

16. The method according to claim 15, wherein the order-specific risk values are based on a risk factor associated with the financial instrument being specified in the received order and the order-specific parameter associated with each order.

* * * * *